United States Patent
Janssen et al.

(10) Patent No.: US 8,034,852 B2
(45) Date of Patent: Oct. 11, 2011

(54) HOLLOW ELEMENT FILLED CURABLE BODY REPAIR COMPOUNDS

(75) Inventors: Jeffrey R. Janssen, Woodbury, MN (US); Mark F. Schulz, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1072 days.

(21) Appl. No.: 11/688,004

(22) Filed: Mar. 19, 2007

(65) Prior Publication Data

US 2008/0230742 A1    Sep. 25, 2008

(51) Int. Cl.
C08J 9/32 (2006.01)
(52) U.S. Cl. ........................ 523/218; 523/219
(58) Field of Classification Search ................ 523/218, 523/219
See application file for complete search history.

(56) References Cited

U.S. PATENT DOCUMENTS

| | | | |
|---|---|---|---|
| 3,873,475 A * | 3/1975 | Pechacek et al. | 523/509 |
| 4,328,967 A * | 5/1982 | Orlando et al. | 473/125 |
| 4,980,414 A | 12/1990 | Naton | |
| 5,028,456 A | 7/1991 | Naton | |
| 5,373,036 A | 12/1994 | Parish et al. | |
| 5,374,669 A * | 12/1994 | Parish et al. | 523/219 |
| 5,384,345 A | 1/1995 | Naton | |
| 5,456,947 A | 10/1995 | Parish et al. | |
| 5,972,092 A | 10/1999 | Cordova | |
| 6,063,864 A | 5/2000 | Mathur et al. | |
| 6,887,926 B1 | 5/2005 | Parhar et al. | |

FOREIGN PATENT DOCUMENTS

| | | |
|---|---|---|
| CN | 1118346 | 3/1996 |
| DE | 10134818 | 12/2002 |
| EP | 0 552 789 | 7/1993 |
| EP | 0742249 | 6/2004 |
| JP | 06-122812 | 5/1994 |
| JP | 2006-062904 | 3/2006 |
| WO | WO95/19379 | 7/1995 |
| WO | WO99/54403 | 10/1999 |
| WO | WO2006/071695 | 7/2006 |

OTHER PUBLICATIONS

3M Scotchlite Glass Bubbles K Series and S Series Product Brochure, (2003).
U.S. Appl. No. 60/870,264, filed Dec. 15, 2006, Janssen et al.

* cited by examiner

*Primary Examiner* — Edward Cain

(57) ABSTRACT

A curable body repair material is described. The curable body repair material includes a curable polymeric resin, and a plurality of hollow elements. The curable body repair includes less than 3% by number of hollow elements having a diameter greater than 100 micrometers. Method of making and using the same are also described.

19 Claims, No Drawings

HOLLOW ELEMENT FILLED CURABLE BODY REPAIR COMPOUNDS

FIELD

The present disclosure relates to curable repair compounds and particularly to curable body repair compounds that include a controlled diameter distribution of hollow elements.

BACKGROUND

Automobile body repair often requires that the damaged area be filled with a body repair compound. The filling compound can be a glass bubble filled polyester resin that is mixed with a peroxide to facilitate cross-linking at room temperature. After mixing, the technician uses a squeegee to spread the repair compound onto the surface of the vehicle to roughly match the contour of the surface. The technician uses an abrasive article to form and shape the body repair material to more closely match the contours of the original body. This process can be repeated two or more times until the damaged area of the vehicle is sufficiently filled and the contour of the original body is matched.

One problem associated with this process is the creation of pinholes within the contoured body repair compound. Pinholes can come from several sources. One source is air that is trapped when the polymer is mixed with the catalyst or when the mixture is spread onto the substrate using a device like a squeegee. As the material is folded or spread, air can get trapped into the material. To overcome these pinholes, multiple layers of body repair compound and lower viscosity putties or glazes are applied to fill the pinholes. Even with these precautions, pinholes will still reveal themselves after sanding, priming, and painting are complete. During the priming and painting process, the exposed pinhole may be bridged by primer or paint coatings and not totally filled. Upon application of subsequent layers of paint such as a clearcoat or after baking, the bridged coatings may collapse resulting in a depression in the surface.

Pinholes are a tremendous source of waste in the process of repairing damaged substrates. Pinholes require multiple layers of putty or filler be applied over the first body repair compound layer to fill the pinholes. Multiple coats of prime layers are required to cover the pinholes. Each application of putty layer or prime layer requires 10 to 20 minutes to complete. Thus, elimination or reduction in the added time and expense of pinholes within the contoured body repair compound is desired.

BRIEF SUMMARY

The present disclosure relates to curable repair compounds and particularly to curable body repair compounds that include a controlled diameter distribution of hollow elements.

In a first embodiment, a curable body repair material includes a curable polymeric resin, and a plurality of hollow elements. The curable body repair includes less than 3% by number of hollow elements having a diameter greater than 100 micrometers.

In another embodiment, a method of manufacturing a curable body repair material includes combining a curable polymeric resin and a plurality of controlled diameter hollow elements to form a curable body repair material. The plurality of hollow elements have an average diameter of less than 100 micrometers and the curable body repair material has less than 3% by number hollow elements having a diameter greater than 100 micrometers.

In a further embodiment, a method of repairing a body includes applying a curable body repair material onto a damaged body substrate. The curable body repair material includes a curable polymeric resin and a plurality of hollow elements having an average diameter of less than 100 micrometers and the curable body repair material has less than 3% by number hollow elements having a diameter greater than 100 micrometers. Then the method includes, curing the curable body repair material to form a solid body repair material, and sanding the solid body repair material to expose hollow element pinholes in the solid body repair material.

DETAILED DESCRIPTION

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "polymer or polymeric" will be understood to include polymers, copolymers (e.g., polymers formed using two or more different monomers), oligomers or monomers that can form polymers, and combinations thereof, as well as polymers, oligomers, monomers, or copolymers that can be blended.

The term "hollow element pinhole" refers to a void formed by a severed or missing hollow element in otherwise continuous solid surface. A hollow element pinhole can have any cross-sectional shape or profile.

The term "diameter" refers to a distance of a straight line segment passing though a center of a body or element and terminating at the body or element periphery. The body or element can have any regular or non-regular shape. Diameter can refer to a length or width of a body or element. Diameter refers to the greatest distance of a straight line segment passing though a center of a body or element and terminating at the body or element periphery.

The present disclosure relates to curable repair compounds and particularly to curable body repair compounds that include a controlled diameter distribution of hollow elements that reduce the effect of hollow element pinholes formed in cured repair compounds. In the past, pinholes from the mixing and spreading process of curable body repair compounds were almost always present. When care is taken to reduce air entrained within the curable repair compound from the mixing and spreading process, as described in co-pending U.S. Provisional Application No. 60/870,264, filed on Dec. 15, 2006, pinholes due to the mixing and spreading process are greatly reduced or substantially eliminated. Applicants have discovered that after careful mixing and spreading as described above, pinholes associated with any hollow glass bubbles (i.e., hollow element pinholes) become evident. Applicants further discovered that by controlling the maximum size of the glass bubbles in the curable resin, the pinholes associated with hollow glass bubbles can be negated or substantially eliminated.

A curable body repair material includes a curable polymeric resin, and a plurality of hollow elements. In many embodiments, the plurality of hollow elements includes glass elements such as glass bubbles. The curable body repair material is substantially free of hollow elements having a diameter greater than 100 micrometers. In many embodiments, the curable body repair material has less than 3% (number basis) of the hollow elements with a diameter of greater than 100 micrometers, or less than 1% (number basis) of the hollow elements with a diameter of greater than 100 micrometers, or less than 0.5% (number basis) of the hollow elements with a diameter of greater than 100 micrometers, or less than 0.1% (number basis) of the hollow elements with a diameter of greater than 100 micrometers. In other embodiments, the curable body repair material is free of hollow elements having a diameter of greater than 100 micrometers.

In many embodiments, the curable body repair material includes a curable polymeric resin, and a plurality of hollow elements being substantially free of hollow elements having a diameter greater than 90 micrometers, and each hollow element, forming the plurality of hollow elements, has a diameter of less than 90 micrometers. In many embodiments, the curable body repair material has less than 3% (number basis) of the hollow elements with a diameter of greater than 90 micrometers, or less than 1% (number basis) of the hollow elements with a diameter of greater than 90 micrometers, or less than 0.5% (number basis) of the hollow elements with a diameter of greater than 90 micrometers, or less than 0.1% (number basis) of the hollow elements with a diameter of greater than 90 micrometers. In other embodiments, the curable body repair material is free of hollow elements having a diameter of greater than 90 micrometers.

In some embodiments, the curable body repair material includes a curable polymeric resin, and a plurality of hollow elements being substantially free of hollow elements having a diameter greater than 75 micrometers, and each hollow element, forming the plurality of hollow elements, has a diameter of less than 75 micrometers. In many embodiments, the curable body repair material has less than 3% (number basis) of the hollow elements with a diameter of greater than 75 micrometers, or less than 1% (number basis) of the hollow elements with a diameter of greater than 75 micrometers, or less than 0.5% (number basis) of the hollow elements with a diameter of greater than 75 micrometers, or less than 0.1% (number basis) of the hollow elements with a diameter of greater than 75 micrometers. In other embodiments, the curable body repair material is free of hollow elements having a diameter of greater than 75 micrometers.

In some embodiments, the curable body repair material includes a curable polymeric resin, and a plurality of hollow elements being substantially free of hollow elements having a diameter greater than 60 micrometers, and each hollow element, forming the plurality of hollow elements, has a diameter of less than 60 micrometers. In many embodiments, the curable body repair material has less than 3% (number basis) of the hollow elements with a diameter of greater than 60 micrometers, or less than 1% (number basis) of the hollow elements with a diameter of greater than 60 micrometers, or less than 0.5% (number basis) of the hollow elements with a diameter of greater than 60 micrometers, or less than 0.1% (number basis) of the hollow elements with a diameter of greater than 60 micrometers. In other embodiments, the curable body repair material is free of hollow elements having a diameter of greater than 60 micrometers.

In some embodiments, the curable body repair material includes a curable polymeric resin, and a plurality of hollow elements being substantially free of hollow elements having a diameter greater than 45 micrometers, and each hollow element, forming the plurality of hollow elements, has a diameter of less than 45 micrometers. In many embodiments, the curable body repair material has less than 3% (number basis) of the hollow elements with a diameter of greater than 45 micrometers, or less than 1% (number basis) of the hollow elements with a diameter of greater than 45 micrometers, or less than 0.5% (number basis) of the hollow elements with a diameter of greater than 45 micrometers, or less than 0.1% (number basis) of the hollow elements with a diameter of greater than 45 micrometers. In other embodiments, the curable body repair material is free of hollow elements having a diameter of greater than 45 micrometers.

The hollow elements are friable to allow the body repair material to be easily abraded during the body repair process. In many embodiments, the plurality of hollow elements have a crush strength (target survival of about 90%) of less than 10,000 pounds per square inch (psi) (68.9 megaPascals (MPa)), or less than 5,000 psi (34.5 MPa), or less than 2,000 psi (13.8 MPa), or less than 1,000 psi (6.9 MPa), or from 10 psi (68.9 kiloPascals (kPa)) to 10,000 psi (68.9 MPa), or from 50 psi (34.5 kPa) to 5,000 psi (34.5 MPa), or from 100 psi (689.5 kPa) to 2000 psi (13.8 MPa).

Crush strength is measured by a Nitrogen Isostatic Crush Strength test method. This method determines the % volume reduction of a hollow element sample when subjected to a specified Nitrogen pressure knowing the density of the hollow elements. A mixture of hollow element and talc is placed into a pycnometer cup and the density of the mixture is determined. Then the mixture is placed into an autoclave pressure testing apparatus and subjected to a nitrogen pressure cycle of a known pressure. After the pressure cycle, the density of the mixture is measured and compared to the initial density. The percent survival is then determined by the following formula: % survival=$100-[[(P_F-P_I)(B+T)\times100]/[P_F[B+T-(P_I/P_T)T]]]$ where $P_I$ is the initial sample density, $P_F$ if the final sample density, $P_T$ is the talc density, B is the weight of the hollow elements and T is the weight of the talc.

The curable body repair material includes the hollow elements in any useful loading amount. In many embodiments, the plurality of hollow elements is in a range of 5 to 70% volume (vol) of the curable body repair material. In some embodiments, the plurality of hollow elements is in a range of 10 to 50% vol of the curable body repair material. The some embodiments, the plurality of hollow elements is in a range of 20 to 35% vol of the curable body repair material.

The hollow elements can have any useful shape. In many embodiments, the hollow elements are spherical, oblong, or elliptical. In some embodiments, the hollow elements have a spherical shape and are described as hollow bubbles. Illustrative hollow glass bubbles are commercially available under the trade designations "Scotchlite K Series", and "Scotchlite S Series", from 3M Company, St. Paul, Minn.

The curable polymeric resin can be any useful polymeric resin that cures to a solid. The term "curable" as used herein refers to reactive material that cures (i.e., irreversibly solidifies). Curing may be assisted by or require the application of heat and/or other sources of energy, such as E-beam, ultraviolet light, visible light, etc. Alternatively or in addition, curing can be assisted by contact with a chemical catalyst, moisture, etc. Other curing mechanisms may be used in place of or in addition to those explicitly identified herein. The irreversible solidification may involve polymerization, crosslinking, or both. In many embodiments, the curable polymeric resin is sufficiently malleable and/or flowable such that it can be manipulated into a variety of shapes, smoothed, troweled, sprayed, etc., prior to curing.

A partial listing of curable polymeric resin includes, acrylics, epoxies, urethanes, silicones, vinyl esters, polyesters, and the like, or combinations thereof. The curable polymeric resin can include one or more non-reactive polymeric materials, as desired.

One class of curable polymeric materials that may benefit from this disclosure are curable body repair materials used in the repair of damaged vehicles and other equipment (e.g., cars, trucks, watercraft, windmill blades, aircraft, recreational vehicles, bathtubs, storage containers, pipelines, etc.). Curable body repair materials can include two reactive components (e.g., resin and catalyst or initiator) which are mixed together to form the curable body repair material. The volumetric ratio of the reactive components may be in the range of, e.g., 1:1 or higher (where higher is, e.g., 2:1, 3:1, etc.) for epoxy or urethane compounds and may be 20:1 or higher, or 25:1 or higher, or 30:1 or higher for unsaturated polyesters with a peroxide catalyst as an initiator. The curable body repair materials may include additives to impart adhesion of the curable body material to common repair surfaces such as, e.g., aluminum, galvanized steel, E-coats, primers, paints, etc. The adhesion additives may have, e.g., anhydride functionality, silane functionality, or amine functionality, and the adhesion additives may or may not be incorporated into the base resin.

In some embodiments, the curable polymeric resin includes a mixture of an unsaturated polyester resin, and a styrene monomer. Illustrative curable, unsaturated polyester based compositions are described in U.S. Pat. No. 6,063,864 (Mathur et al.); U.S. Pat. No. 5,456,947 (Parish et al.); U.S. Pat. No. 4,980,414 (Naton); U.S. Pat. No. 5,028,456 (Naton); and U.S. Pat. No. 5,373,036 (Parish et al.), which are incorporated by reference herein, to the extent they do not conflict with this disclosure. Other illustrative curable, unsaturated polyester based compositions are described in WO 95/19379 (Ruggeberg), which is incorporated by reference herein, to the extent it does not conflict with this disclosure.

In many embodiments, the curable body repair material includes less than 0.5% vol air or gas, not including the air or gas contained within the hollow elements. This can be accomplished by any useful method such as, for example, degassing the curable body repair material.

The curable body repair material described herein can be formed using any useful method. In many embodiments, the curable body repair material is formed by providing a curable polymeric resin, providing a plurality of hollow elements, where the plurality of hollow elements have an average diameter of less than 100, 90, 75, 60, or 45 micrometers, removing substantially all hollow elements having a diameter greater than 100, 90, 75, 60, or 45 micrometers, respectively, from the plurality of hollow elements to form a plurality of controlled diameter hollow elements, and combining the curable polymeric resin and the plurality of controlled diameter hollow elements to form the curable body repair material.

The hollow elements having a diameter greater than 100 micrometers, or 90 micrometers, or 75 micrometers, or 60 micrometers, or 45 micrometers can be removed from the plurality of hollow elements by any size separation method such as sieving or screening, for example or by forming the hollow elements with the controlled diameter.

The curable body repair materials described herein are useful for repairing a body of a damaged vehicle and other equipment (e.g., cars, trucks, watercraft, windmill blades, aircraft, recreational vehicles, bathtubs, storage containers, pipelines, etc.). The repair method includes applying a curable body repair material onto a damaged body substrate, the curable body repair material including a curable polymeric resin and a plurality of hollow elements having an average diameter of less than 100 micrometers and the curable body repair material being substantially free of hollow elements having a diameter greater than 100 micrometers, 90 micrometers, 75 micrometers, 60 micrometers, or 45 micrometers as desired. Then the applied curable body material is cured to form a solid body repair material. The method then includes, sanding the solid body repair material to expose hollow element pinholes in the solid body repair material. In some embodiments, the solid body repair material is substantially free of hollow element pinholes having a diameter greater than 100 micrometers, 90 micrometers, 75 micrometers, 60 micrometers, or 45 micrometers, respectively. The method then includes, applying a polymeric layer to the solid body repair material to substantially fill the hollow element pinholes.

In many embodiments, the polymeric primer or paint layer substantially fills the hollow element hollow element pinholes with a dry thickness in a range from 1 to 100 micrometers. In some embodiments, a single polymeric layer substantially fills the hollow element pinholes with a dry thickness in a range from 10 to 50 micrometers.

EXAMPLES

Materials

The following abbreviations are used in the examples.

RS1: An unsaturated polyester resin with styrene, commercially available under the trade designation "Polylite 32367-00" from Reichhold Chemicals, Inc., Durham N.C.:

RS2: An unsaturated polyester resin with styrene, commercially available under the trade designation "Polylite 32374-00" from Reichhold Chemicals, Inc., Durham N.C.:

AS1: A treated amorphous fumed silica, commercially available under the trade designation "Cab-o-sil TS-610" from Cabot Corporation; Boston Mass.:

ST1: Styrene, commercially available from Alfa Aesar, a Johnson Matthey Corporation, Ward Hill, Mass.:

TD1: Rutile titanium dioxide, commercially available under the trade designation "Ti-Pure R-960 Titanium Dioxide" from E.I. du Pont de Nemours and Company; Wilmington, Del.:

TC1: Talc, commercially available under the trade designation "VERTAL 92" from Luzenac America, Centennial Colo.:

GB1: Glass bubbles, commercially available under the trade designation "Scotchlite S15" from 3M Company:

GB2: Glass bubbles, commercially available under the trade designation "Scotchlite S15" from 3M Company, filtered through a sieve such that the maximum diameter of glass bubble was 125 micrometers:

GB3: Glass bubbles, commercially available under the trade designation "Scotchlite S15" from 3M Company, filtered through a sieve such that the maximum diameter of glass bubble was 90 micrometers:

GB4: Glass bubbles, commercially available under the trade designation "Scotchlite S15" from 3M Company, filtered through a sieve such that the maximum diameter of glass bubble was 63 micrometers:

GB5: Glass bubbles, commercially available under the trade designation "Scotchlite S15" from 3M Company, filtered through a sieve such that the maximum diameter of glass bubble was 53 micrometers:

GB6: Glass bubbles, commercially available under the trade designation "Scotchlite S15" from 3M Company, filtered through a sieve such that the maximum diameter of glass bubble was 45 micrometers:

GB7: Glass bubbles, commercially available under the trade designation "Scotchlite S22" from 3M Company:

GB8: Glass bubbles, commercially available under the trade designation "Scotchlite S22" from 3M Company, filtered through a sieve such that the maximum diameter of glass bubble was 125 micrometers:

GB9: Glass bubbles, commercially available under the trade designation "Scotchlite S22" from 3M Company, filtered through a sieve such that the maximum diameter of glass bubble was 90 micrometers:

GB10: Glass bubbles, commercially available under the trade designation "Scotchlite S22" from 3M Company, filtered through a sieve such that the maximum diameter of glass bubble was 63 micrometers:

GB11: Glass bubbles, commercially available under the trade designation "Scotchlite S22" from 3M Company, filtered through a sieve such that the maximum diameter of glass bubble was 53 micrometers:

GB12: Glass bubbles, commercially available under the trade designation "Scotchlite S22" from 3M Company, filtered through a sieve such that the maximum diameter of glass bubble was 45 micrometers:

GB13: Glass bubbles, commercially available under the trade designation "Scotchlite K1" from 3M Company:

GB14: Glass bubbles, commercially available under the trade designation "Scotchlite K1" from 3M Company, filtered through a sieve such that the maximum diameter of glass bubble was 125 micrometers:

GB15: Glass bubbles, commercially available under the trade designation "Scotchlite K1" from 3M Company, filtered through a sieve such that the maximum diameter of glass bubble was 90 micrometers:

GB16: Glass bubbles, commercially available under the trade designation "Scotchlite K1" from 3M Company, filtered through a sieve such that the maximum diameter of glass bubble was 63 micrometers:

GB17: Glass bubbles, commercially available under the trade designation "Scotchlite K1" from 3M Company, filtered through a sieve such that the maximum diameter of glass bubble was 53 micrometers:

GB18: Glass bubbles, commercially available under the trade designation "Scotchlite K1" from 3M Company, filtered through a sieve such that the maximum diameter of glass bubble was 45 micrometers:

Note: The sieves used to filter the glass bubbles were prepared per A.S.T.M. E-11 Specifications and are available from W.S. Tyler Incorporated, Mentor, Ohio.

Glass Bubble Density: Measured, per the manufacturer's recommendations, using an "AccuPyc Model 1330 Pycnometer" from Micromeritics Corporation, Norcross, Ga. These particles were analyzed with 10 purges of helium at 19.5 pounds per square inch gauge ($p_g$) (134.5 kPa) and the analysis was conducted with 20 runs at 19.5 $p_g$ (134.5 kPa) and an equilibrium rate of 0.005 $p_g$ (34.5 Pa) per minute.

TABLE 1

| Glass Bubble ID | Manufacturer's Designation | Maximum Diameter | Density g/cc |
| --- | --- | --- | --- |
| GB1 | Scotchlite S15 | >125 | 0.1500 est. |
| GB2 | Scotchlite S15 | 125 | 0.1450 |
| GB3 | Scotchlite S15 | 90 | 0.1662 |
| GB4 | Scotchlite S15 | 63 | 0.2212 |
| GB5 | Scotchlite S15 | 53 | 0.2603 |
| GB6 | Scotchlite S15 | 45 | 0.3612 |
| GB7 | Scotchlite S22 | >125 | 0.2104 |
| GB8 | Scotchlite S22 | 125 | 0.2100 |
| GB9 | Scotchlite S22 | 90 | 0.2136 |
| GB10 | Scotchlite S22 | 63 | 0.2310 |
| GB11 | Scotchlite S22 | 53 | 0.2577 |
| GB12 | Scotchlite S22 | 45 | 0.3089 |
| GB13 | Scotchlite K1 | >125 | 0.1239 |
| GB14 | Scotchlite K1 | 125 | 0.1313 |
| GB15 | Scotchlite K1 | 90 | 0.1611 |
| GB16 | Scotchlite K1 | 63 | 0.2004 |
| GB17 | Scotchlite K1 | 53 | 0.2265 |
| GB18 | Scotchlite K1 | 45 | 0.2734 |

Pre-Mix 1, 135 grams of RS1 was added to a 500 milliliter (ml.) glass jar and stirred at 20 degrees centigrade (° C.), using air powered mixer (model number 2AM-NCC-16 from the Gast Manufacturing Corporation, Benton Harbor, Mich.) using a Cowles high shear angled mixing blade. 15 grams of AS1 was added slowly to the resin and stirred until homogeneous. The addition time was approximately 3 minutes and the mix time was another 10 minutes.

Pre-Mix 2, Pre-mix 2 was prepared according to the method described in Pre-mix 1, wherein RS1 was replaced with an equal weight of RS2.

Comparative A—Body filler was prepared as follows. 6.12 grams Pre-mix 1 and 4.58 grams Pre-mix 2 were added to a 200 ml. plastic cup (model 501 221 p-j Max 100 from FlackTek Inc., Landrum, S.C.). To this was added, at 20° C., 2.20 grams ST1, 2.00 grams TD1, 13.4 RS1, 17.92 grams RS2, 2.48 grams GB1 and 40.50 grams TC1, and the mixture stirred at 3,300 rpm for 240 seconds. The volume of GB1 was 25.68%. A lid was applied to the plastic cup (model 501 221 m-1 max 100 lids from FlackTek Inc., Landrum, S.C.). The filled cup with the lid was then inserted into a high speed mixer, (Speedmixer DAC 150 from FlackTek Inc., Landrum, S.C.). This was repeated six times. Four samples were used to fill the foil pouch and two samples were combined to measure viscosity.

The mixture was transferred to a 300 ml. foil pouch, obtained from PAWAG Verpackungen Gesellschaft GmbH., Wolfurt, Germany. The pouch was then sealed with a metal clip and then placed into a nitrile glove, immersed in an ultrasonic water bath, model number "FS5 Dual Action Ultrasonic Cleaner" (Fischer Scientific, Waltham, Mass.) and vibrated for 2 hours. The nitrile glove was removed, and the pouch sealed with another metal clip such that minimal air was trapped in the pouch. An end cap that mates with the dynamic mixing nozzle was applied to the sealed pouch by gluing an end cap onto the end of the pouch. The molded cap was obtained by cutting it off of the large foil package of dental impressioning compound kit "3M ESPE Imprint II Penta HB, part number 77804" from 3M Company.

The hardener side was prepared by transferring "3M Blue Cream Hardener" 3M Part Number 051131-05766, from 3M Company into a 2 ml plastic syringe (trade designation "Luer" from Heinke Sass Wolf GmbH, Tuttlingen, Germany). The tip of the syringe was placed in a molded cap. The molded cap was obtained by cutting it off of the small foil package of the dental impressioning compound kit.

The filler pouch was inserted into a hand-built dynamic mixer, along with a peroxide hardener. A dynamic mixer tip, "3M ESPE Imprint II Penta Mixing Tips Refill Kit, 3M ID Number 70-2011-1918-0" available from the 3M Company St. Paul Minn., was attached to the end of the dynamic mixer.

A test panel was obtained from Advanced Coatings Technologies in Hillsdale Mich. The panel was 18 inch by 24 inch (45.7 cm×61.0 cm). The paint on the panel was abraded off using an 80 grit abrasive such that the paint and primer was removed from the test panel and bare steel was exposed. A 12.7 cm long bead of the mixture (about 75 grams) was dispensed through the dynamic mixing gun onto the horizontal test panel with the nozzle against the surface of the panel. Having the nozzle against the test panel insures no air is trapped between the panel and the mixture. Using a plastic 15 cm wide squeegee (part number 051131-05844, obtained from 3M Company) and a single motion, spread the bead down the panel to create (approximately) a 5-inch by 12-inch by 0.1 (12.7 by 30.5 by 0.25 centimeters (cm)) galvanized metal plate. The volumetric ratio of the curable resin was approximately 42 parts to 1 part hardener. After curing for 20 minutes at 20° C., the filler was manually sanded in three successive steps using an 80 grit abrasive, trade designation "3M Imperial Hookit II 745I 80" grit abrasive on a sanding block (Part Number 051131-05240), followed by manually sanding with "3M Imperial Hookit II 734U" 180 grit abrasive and followed by manually sanding with "3M Imperial Hookit II 734U" 320 grit abrasive. The abrading process removed about 50% of the thickness of the applied filler material. The sanded surface was cleaned by blowing with high pressure air. A single layer of primer was applied to the surface, made by three parts by volume "NCP271 epoxy primer" and one part "NCX 275 activator" from PPG Industries, Strongville, Ohio in a plastic "3M PPS Paint Preparation System" sleeve and cup supplied by 3M Company. The spray gun used was a gravity fed spray gun, Part Number 16212 3M PPS Paint Preparation System model from 3M Company using a 1.3 millimeter (mm) nozzle and 30 pounds per square inch (206.8 kiloPascals (kPa)) air pressure. The dried thickness of primer was approximately 10-50 micrometers. The dry thickness was measured using an Electrometer 300 coating thickness gauge supplied by Electrometer Instruments Limited, Manchester, England. The probe for ferrous substrates was used and the thickness of the calibration film was 243 micrometers. Readings were taken on the panels used to make the examples. The readings were taken in the region where there was only primer over metal. At least 25 readings were taken per panel.

Comparative Example B

The procedure as described in Comparative A was repeated, wherein glass bubbles GB1 were replaced by an equal volume of GB7.

Comparative Example C

The procedure as described in Comparative A was repeated, wherein glass bubbles GB1 were replaced by an equal volume of GB13.

Example 1

The procedure as described in Comparative A was repeated, wherein glass bubbles GB1 were replaced by an equal volume of GB2.

Example 2

The procedure as described in Comparative A was repeated, wherein glass bubbles GB1 were replaced by an equal volume of GB3.

Example 3

The procedure as described in Comparative A was repeated, wherein glass bubbles GB1 were replaced by an equal volume of GB4.

Example 4

The procedure as described in Comparative A was repeated, wherein glass bubbles GB1 were replaced by an equal volume of GB5.

Example 5

The procedure as described in Comparative A was repeated, wherein glass bubbles GB1 were replaced by an equal volume of GB6.

Example 6

The procedure as described in Comparative A was repeated, wherein glass bubbles GB1 were replaced by an equal volume of GB8.

Example 7

The procedure as described in Comparative A was repeated, wherein glass bubbles GB1 were replaced by an equal volume of GB9.

Example 8

The procedure as described in Comparative A was repeated, wherein glass bubbles GB1 were replaced by an equal volume of GB10.

Example 9

The procedure as described in Comparative A was repeated, wherein glass bubbles GB1 were replaced by an equal volume of GB11.

Example 10

The procedure as described in Comparative A was repeated, wherein glass bubbles GB1 were replaced by an equal volume of GB12.

Example 11

The procedure as described in Comparative A was repeated, wherein glass bubbles GB1 were replaced by an equal volume of GB14.

Example 12

The procedure as described in Comparative A was repeated, wherein glass bubbles GB1 were replaced by an equal volume of GB15.

Example 13

The procedure as described in Comparative A was repeated, wherein glass bubbles GB1 were replaced by an equal volume of GB16.

Example 14

The procedure as described in Comparative A was repeated, wherein glass bubbles GB1 were replaced by an equal volume of GB17.

Example 15

The procedure as described in Comparative A was repeated, wherein glass bubbles GB1 were replaced by an equal volume of GB18.

Example Formulations by Weight (normalized to a maximum weight of 90 grams per batch and held at a constant volume of glass bubbles—25.7%) are shown in TABLES 2, 3 and 4.

TABLE 2

|  | Comp A | Comp B | Comp C | Ex 1 | Ex 2 | Ex 3 | Ex 4 | Ex 5 |
|---|---|---|---|---|---|---|---|---|
| RS1 | 17.2 | 17.8 | 17.9 | 17.9 | 17.8 | 17.7 | 17.6 | 17.3 |
| RS2 | 13.4 | 13.3 | 13.4 | 13.4 | 13.3 | 13.3 | 13.2 | 12.9 |
| TC1 | 40.5 | 40.2 | 40.5 | 40.5 | 40.2 | 39.9 | 39.8 | 39.1 |
| TD1 | 2.0 | 2.0 | 2.0 | 2.0 | 2.0 | 2.0 | 2.0 | 1.9 |
| ST1 | 2.2 | 2.2 | 2.2 | 2.2 | 2.2 | 2.2 | 2.2 | 2.1 |
| Premix 1 | 4.6 | 4.5 | 4.6 | 4.6 | 4.6 | 4.6 | 4.5 | 4.4 |
| Premix 2 | 6.1 | 6.1 | 6.1 | 6.1 | 6.1 | 6.1 | 6.0 | 5.9 |
| Glass Bubbles | 2.4 GB1 | 3.4 GB7 | 2.0 GB13 | 2.4 GB2 | 2.7 GB3 | 3.6 GB4 | 4.2 GB5 | 5.8 GB6 |
| Total | 89.1 | 89.5 | 88.8 | 89.1 | 89.0 | 89.3 | 89.5 | 89.5 |

TABLE 3

|  | Ex 6 | Ex 7 | Ex 8 | Ex 9 | Ex 10 | Ex 11 | Ex 12 | Ex 13 |
|---|---|---|---|---|---|---|---|---|
| RS1 | 17.8 | 17.8 | 17.7 | 17.6 | 17.3 | 17.8 | 17.8 | 17.7 |
| RS2 | 13.3 | 13.3 | 13.3 | 13.2 | 12.9 | 13.3 | 13.3 | 13.3 |
| TC1 | 40.2 | 40.2 | 40.1 | 39.8 | 39.1 | 40.2 | 40.2 | 40.1 |
| TD1 | 2.0 | 2.0 | 2.0 | 2.0 | 1.9 | 2.0 | 2.0 | 2.0 |
| ST1 | 2.2 | 2.2 | 2.2 | 2.2 | 2.1 | 2.2 | 2.2 | 2.2 |
| Premix 1 | 4.4 | 4.5 | 4.5 | 4.5 | 4.5 | 4.4 | 4.5 | 4.5 |
| Premix 2 | 6.1 | 6.1 | 6.1 | 6.0 | 5.9 | 6.1 | 6.1 | 6.1 |
| Glass Bubbles | 3.4 GB8 | 3.5 GB9 | 3.8 GB10 | 4.2 GB11 | 4.9 GB12 | 2.6 GB14 | 2.6 GB15 | 3.3 GB16 |
| Total | 89.5 | 89.5 | 89.6 | 89.5 | 88.7 | 88.2 | 88.6 | 89.1 |

TABLE 4

|  | Ex 14 | Ex 15 |
|---|---|---|
| RS1 | 17.6 | 17.3 |
| RS2 | 13.2 | 12.9 |
| TC1 | 39.8 | 39.1 |
| TD1 | 2.0 | 1.9 |
| ST1 | 2.2 | 2.1 |
| Premix 1 | 4.5 | 4.4 |
| Premix 2 | 6.0 | 5.9 |
| Glass Bubbles | 3.7 GB17 | 4.37 GB18 |
| Total | 89.0 | 88.1 |

Visible Hollow Element Pinholes—Visible hollow element pinholes per 6.45 square cm after priming. The primed samples were partitioned into areas that were 2.54 cm×2.54 cm using a fine permanent marker. The area was illuminated at a low angle (approximately 5 degrees) with a daylight lamp, trade designation "3M PPS Sun Gun Color Matching Light" from 3M Company. The hollow element pinholes become visible due to the shadow created by the hollow element pinhole. The visible hollow element pinholes were counted by placing a dot on each of the hollow element pinholes with the permanent marker. This was repeated 5 times and the average value of the five areas was reported in Table 5.

TABLE 5

| Example Number | Visible Hollow Element Pinholes per 6.45 square cm |
|---|---|
| Comparative A | 38.0 |
| Example 1 | 41.2 |
| Example 2 | 28.2 |
| Example 3 | 0.5 |
| Example 4 | 0.2 |
| Example 5 | 0.0 |
| Comparative B | 36.1 |
| Example 6 | 21.7 |
| Example 7 | 4.0 |
| Example 8 | 0.0 |
| Example 9 | 0.0 |
| Example 10 | 1.2 |
| Comparative C | 128.4 |
| Example 11 | 83.9 |
| Example 12 | 3.9 |
| Example 13 | 0.2 |
| Example 14 | 0.2 |
| Example 15 | 2.3 |

Thus, embodiments of the HOLLOW ELEMENT FILLED CURABLE BODY REPAIR COMPOUNDS are disclosed. One skilled in the art will appreciate that embodiments other than those disclosed are envisioned. The disclosed embodiments are presented for purposes of illustration and not limitation, and the present invention is limited only by the claims that follow.

What is claimed is:

1. A curable body repair material comprising:

a curable polymeric resin; and a plurality of hollow glass elements;

wherein, the curable body repair material comprises less than 0.3% by volume hollow glass elements having a diameter greater than 80 micrometers.

2. A curable body repair material according to claim 1, wherein the curable body repair material comprises less than 0.5% vol air or gas, not including the air or gas contained within the hollow glass elements.

3. A curable body repair material comprising:
   a curable polymeric resin; and
   a plurality of hollow glass elements;
   wherein, the curable body repair material comprises less than 3% by volume hollow glass elements having a diameter greater than 70 micrometers.

4. A curable body repair material according to claim 3, wherein the curable body repair material comprises less than 0.8% by volume hollow glass elements having a diameter greater than 70 micrometers.

5. A curable body repair material according to claim 3, wherein the curable body repair material comprises less than 0.5% vol air or gas, not including the air or gas contained within the hollow glass elements.

6. A curable body repair material comprising:
   a curable polymeric resin; and
   a plurality of hollow glass elements;
   wherein, the curable body repair material comprises less than 3% by volume hollow glass elements having a diameter greater than 60 micrometers.

7. A curable body repair material according to claim 6, wherein the curable body repair material comprises less than 0.5% by volume hollow glass elements having a diameter greater than 60 micrometers.

8. A curable body repair material according to claim 6, wherein the curable body repair material comprises less than 0.5% vol air or gas, not including the air or gas contained within the hollow glass elements.

9. A method of repairing a body comprising;
   applying a curable body repair material onto a damaged body substrate, the curable body repair material comprising a curable polymeric resin and a plurality of hollow glass elements having an average diameter of less than 80 micrometers and the curable body repair material comprises less than 3% by volume hollow glass elements having a diameter greater than 80 micrometers;
   curing the curable body repair material to form a solid body repair material; and
   sanding the solid body repair material to expose hollow glass element pinholes in the solid body repair material.

10. A method according to claim 9, further comprising applying a polymeric layer to the solid body repair material to substantially fill the hollow glass element pinholes.

11. A method according to claim 9, wherein the curable body repair material has less than 0.5% vol air or gas, not including the air or gas contained within the hollow glass elements.

12. A method of repairing a body comprising;
   applying a curable body repair material onto a damaged body substrate, the curable body repair material comprising a curable polymeric resin and a plurality of hollow glass elements having an average diameter of less than 70 micrometers and the curable body repair material comprises less than 3% by volume glass hollow elements having a diameter greater than 70 micrometers;
   curing the curable body repair material to form a solid body repair material; and
   sanding the solid body repair material to expose hollow glass element pinholes in the solid body repair material.

13. A method according to claim 12, wherein the curable body repair material comprises less than 0.8% by volume hollow glass elements having a diameter greater than 70 micrometers.

14. A method according to claim 12, further comprising applying a polymeric layer to the solid body repair material to substantially fill the hollow glass element pinholes.

15. A method according to claim 12, wherein the curable body repair material has less than 0.5% vol air or gas, not including the air or gas contained within the hollow glass elements.

16. A method of repairing a body comprising;
   applying a curable body repair material onto a damaged body substrate, the curable body repair material comprising a curable polymeric resin and a plurality of hollow glass elements having an average diameter of less than 60 micrometers and the curable body repair material comprises less than 3% by volume hollow glass elements having a diameter greater than 60 micrometers;
   curing the curable body repair material to form a solid body repair material; and
   sanding the solid body repair material to expose hollow glass element pinholes in the solid body repair material.

17. A method according to claim 16, wherein the curable body repair material comprises less than 0.5% by volume hollow glass elements having a diameter greater than 60 micrometers.

18. A method according to claim 16, further comprising applying a polymeric layer to the solid body repair material to substantially fill the hollow glass element pinholes.

19. A method according to claim 16, wherein the curable body repair material has less than 0.5% vol air or gas, not including the air or gas contained within the hollow glass elements.

* * * * *